United States Patent [19]

Okada

[11] Patent Number: 5,163,811
[45] Date of Patent: Nov. 17, 1992

[54] BRAKE MECHANISM FOR VEHICLES
[75] Inventor: Masaki Okada, Fujisawa, Japan
[73] Assignee: Isuzu Motors Limited, Tokyo, Japan
[21] Appl. No.: 354,288
[22] Filed: Aug. 30, 1991

Related U.S. Application Data

[63] Continuation of Ser. No. 384,623, Jul. 25, 1989, abandoned.

[30] Foreign Application Priority Data

Jul. 25, 1988 [JP] Japan .................. 63-183670

[51] Int. Cl.⁵ ............................ F01D 15/12
[52] U.S. Cl. ......................... 415/123; 415/124.1;
188/71.5; 192/85 R
[58] Field of Search ............ 415/122.1, 123, 124.1,
415/18, 170.1; 188/71.5

[56] References Cited

U.S. PATENT DOCUMENTS

| | | | |
|---|---|---|---|
| 1,951,045 | 3/1934 | Willgoos | 415/123 |
| 1,977,553 | 10/1934 | Halford | 415/123 |
| 2,614,798 | 10/1952 | Rubbra | 415/18 |
| 2,643,614 | 6/1953 | Rosenkrans | 415/123 |
| 2,660,033 | 11/1953 | Bowden et al. | 415/123 |
| 3,128,714 | 4/1964 | Arkless et al. | 415/170.1 |
| 3,880,547 | 4/1975 | Hagen | 415/123 |
| 3,961,867 | 6/1976 | Woollenweber | 415/170.1 |
| 4,693,353 | 9/1987 | Kobayashi et al. | 192/85 R |
| 4,882,906 | 11/1989 | Sekiyama et al. | 60/624 |

FOREIGN PATENT DOCUMENTS 1073494 2/1984 U.S.S.R. .................. 415/123

Primary Examiner—John T. Kwon
Attorney, Agent, or Firm—Dykema Gossett

[57] ABSTRACT

A brake mechanism used in a vehicle comprises: a gear connected to an engine of the vehicle; a casing; a radial compressor disposed in the casing and having an impeller, an impeller shaft extending from the back of the impeller in the casing, a suction port, and an outlet port for sucking in air from the suction port, compressing it within the casing, and delivering it from the outlet port by the impeller; a gear that connects the impeller shaft with the engine output shaft gear; a shaft support for rotatably supporting the impeller shaft; and a recess formed in the back of the impeller for accepting the shaft support. The arrangement substantially raises the resonant vibration frequency of the impeller shaft due to a coupling imbalance derived from the impeller construction so that resonant vibration is prevented during ordinary engine operation since the length of the impeller shaft between the point of rotational support and its rear end is substantially elongated whereas the overhang, i.e., that distance between the point of rotational support to the impeller's center of gravity, is shortened. This arrangement, however, does not elongate the total length from the impeller tip to the impeller shaft rear end.

12 Claims, 2 Drawing Sheets

BRAKE MECHANISM FOR VEHICLES

This is a continuation of copending application(s) Ser. No. 07/384,623 filed on Jul. 25, 1989, now abandoned.

BACKGROUND OF THE INVENTION

1. Technical Field

The present invention relates to a brake mechanism used in a motor vehicle of a type equipped with a radial flow compressor connected to the crankshaft of the engine for exerting a braking force against the crankshaft using the air compressing work of the compressor as the braking force. More particularly, it relates to a brake mechanism in which resonating vibration is prevented in the radial compressor at its impeller and impeller shaft.

2. Background Art

Numerous arrangements are known in the art which function as a power recovery turbine, including a construction in which an impeller is attached to only one end of the output shaft or the crankshaft of the engine, as is disclosed in Japanese Patent Application No. 62-136474 (1987), entitled "Turbine Brake Mechanism."

In the Japanese patent application mentioned above, and as is illustrated in FIG. 2 of the accompanying drawings, a radial compressor c is connected to one end of the crankshaft b of the engine a. The compressor c is driven by the shaft b and compresses and delivers a gas it has sucked in. In other words, the radial compressor c consumes energy from the engine, thereby braking the engine and thus the vehicle. The gas may be either external air or exhaust gas.

In another proposed power recovery turbine arrangement, a turbine is provided in the exhaust line in such a way that the turbine shaft is connected with an engine crankshaft via a gear train so as to effectively recover the energy of the exhaust gas.

In the latter mentioned arrangement, only one impeller is attached to an end of the impeller shaft. This means that the distance from the center of gravity of the impeller to the point of rotational support of the impeller shaft (called "overhang") is necessarily long. Structurally speaking, this arrangement is in contrast to a turbocharger, where a pair of impellers (a turbine and a blower) are attached to either end of a common rotating shaft, the shaft being supported at each of its ends.

One problem of the above-mentioned structure having a large overhang is that the system's resonant frequency is low due to the imbalance couple that is inevitably present; namely, such a rotation system is liable to undergo resonating vibration at a low frequency corresponding to a low engine revolution speed within the ordinary service range. Even though this difficulty can be overcome by employing a longer impeller shaft, since the longer the shaft, the higher the resonant frequency, such a solution entails undesirable elongation of the total dimension of the impeller system, i.e. the distance between the impeller tip to the rear end of the impeller shaft becomes longer.

SUMMARY OF THE INVENTION

One major object of the present invention is to prevent the resonant vibration of the impeller shaft by increasing the distance between the point of rotational support and the impeller shaft rear end (called the "shaft marginal length" hereafter), without increasing the total length, i.e., that from the impeller tip to the impeller shaft rear end (called "impeller total length"), while holding the overhang (the distance between impeller's center of gravity and the point of rotary support) as short as possible, thereby raising the resonant frequency of the impeller shaft with respect to the imbalance couple. Other purposes and objects will be disclosed or will become apparent in due course.

To attain the objects of the present invention, there is provided a brake mechanism which comprises: a compressor casing; a radial flow compressor housed in the casing and having an impeller; an impeller shaft; a suction port and a delivery port for sucking in a gas, the gas being either air or exhaust, from the suction port, compressing it, and delivering it out through the delivery port; a gear train that connects the impeller shaft, which extends into the impeller casing, with the engine's power shaft; a shaft supporting member provided at the backside of the impeller so as to support the impeller shaft; and a recess or a depression formed in the back of the impeller so as to accept the shaft supporting member. In this arrangement, the overhang is substantially shortened and the shaft marginal length is substantially elongated without altering the impeller total length. Therefore, the impeller shaft's resonant frequency shifts to a higher frequency, and the resonant vibration is prevented in the impeller and its shaft in the range of engine revolution in ordinary service.

DESCRIPTION OF THE PREFERRED EMBODIMENT

Figure 1:
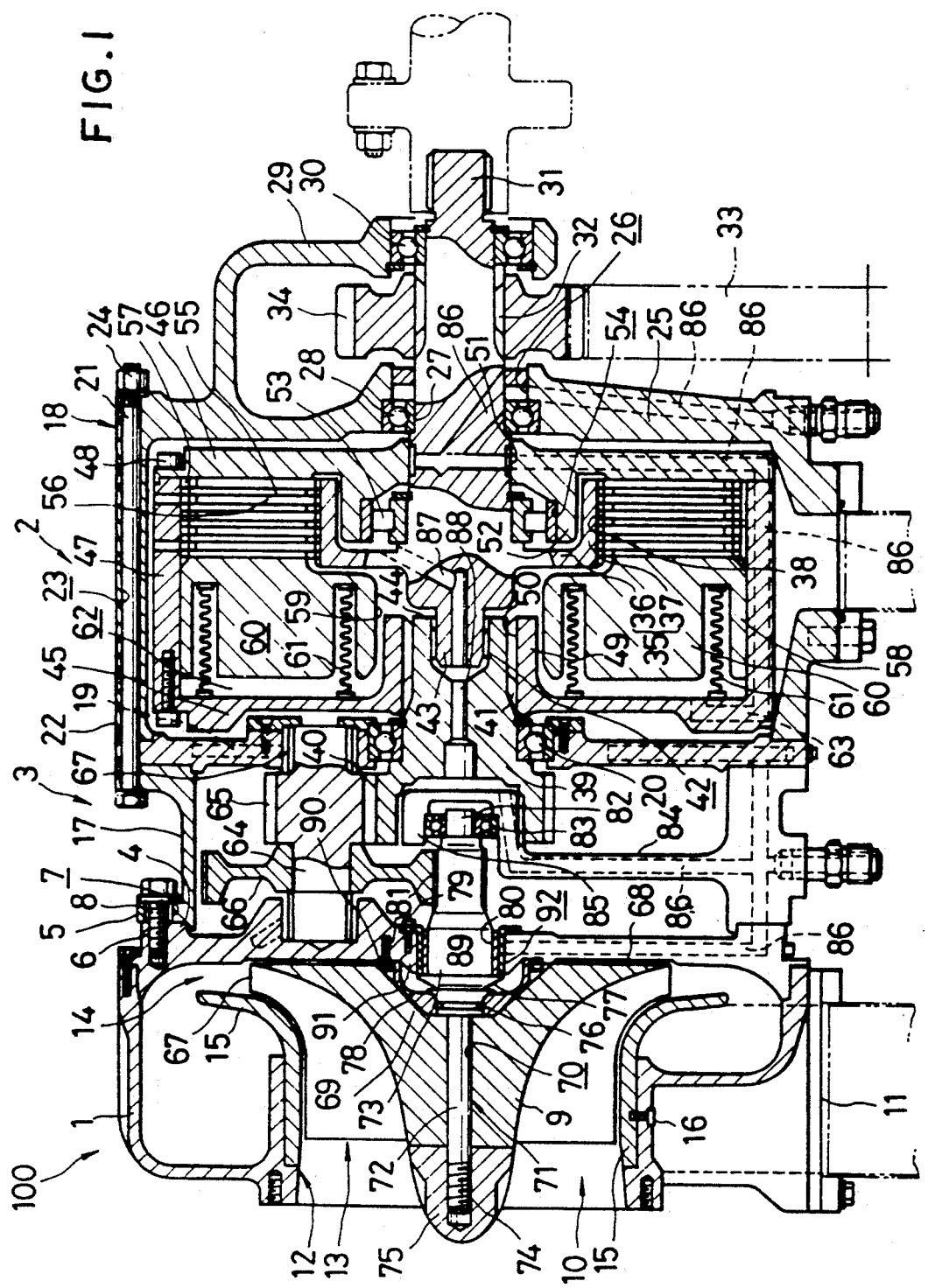
FIG. 1 is a cross-sectional view of the brake mechanism of a vehicle according to the present invention.
Figure 2:
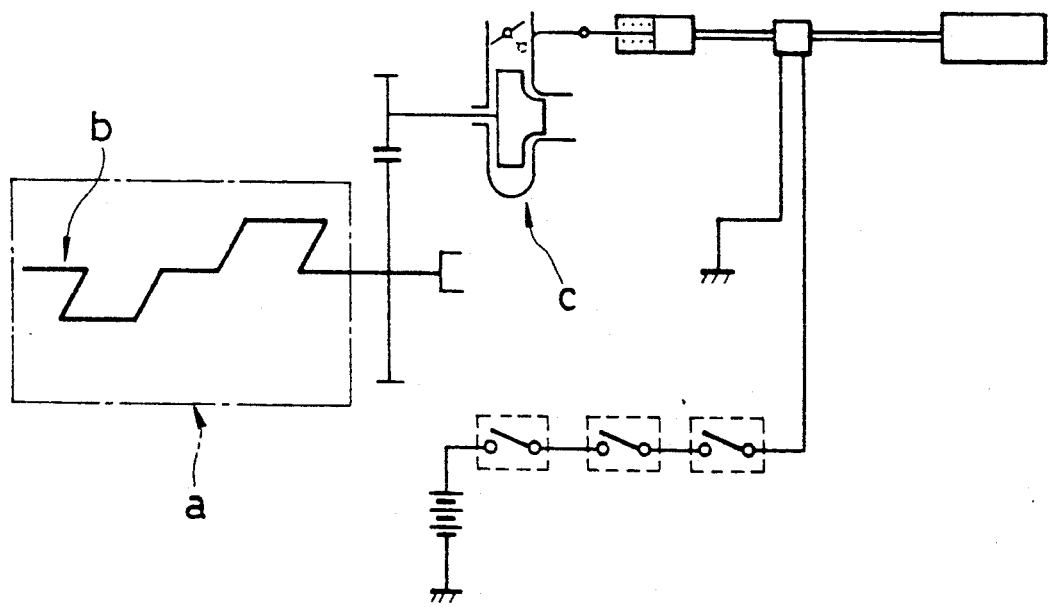
FIG. 2 is a system diagram showing an example of the prior art brake mechanism.

In describing one preferred embodiment of the present invention with reference to the attached diagrams, as shown in FIG. 1, a brake mechanism for vehicles comprises a radial flow compressor 100, a transmission mechanism, and a clutch mechanism, all being housed in a brake casing 3 divisble in the axial direction of the compressor ("axial direction") and a direction transverse to the axial direction ("radial direction"). Left in the drawing is referred to as "front" while right will be referred to as "rear" hereafter.

The brake casing 3 comprises an impeller casing 1, which is divisible into two parts and a cylindrically shaped casing 2 ("mechanism casing") for the transmission and the clutch mechanism. The casings 1 and 2 are joined to each other by a socket-and-spigot joint in the axial direction.

In the case of the illustrated embodiment, the impeller casing 1 and the mechanism casing 2 both end with a flange 4 or 5 around the socket-and-spigot joint. A number of female-threaded holes 6 are formed in the flange 4 of the impeller casing 1, and a corresponding number of bolt holes 7 are bored in the opposing flange 5 of the mechanism casing 2. Ready joining of the two casings 1 and 2 is ensured by simply screwing the connecting bolts 8 into the thread 6.

The impeller casing 1 is in the form of an involute, and the impeller 9 is rotatably housed in the involute casing 1. An air inlet or suction port 10 is formed on its central axis, while a compressed air delivery port 11 is formed at the downstream end of the involute. A bell mouth 15 is fitted in the impeller casing 1 at its inner wall 12 near the suction port 10, so as to surround blades 13 of the impeller 9, and constitutes a nozzle throat 14 for the impeller 9. The bell mouth 15 is firmly attached to the impeller casing 1 with screws 16.

The mechanism casing 2 includes a transmission casing 17 and a clutch casing 18. A disc-shaped flange member 19 connects the casings 17 and 18 through a socket-and-spigot joint. At the center of the flange member 19 there is provided a first anti-friction bearing 20 that rotatably supports a coupling (to be described later). The transmission casing 17, the clutch casing 18, and the flange member 19 are mutually joined into a unified body with connecting bolts 21 and nuts 24. Bolt holes 23 are bored through the body 22 of the clutch casing.

The clutch casing 18 is closed at its end opposite to the impeller 9 with a first shaft support 25. The first shaft support 25 has a shaft hole at its center. The shaft hole 26 is enlarged at its front half (left half in the drawing), in which a second anti-friction bearing 28 is fitted. The clutch casing 18 has a second shaft support 29 which extends rearward and parallel to the axial direction by a certain length, then downward or transversely to the axis of the casing 1. At the end of the second support 29, there is formed a ring which houses a third anti-friction bearing 30 in axial alignment with the second anti-friction bearing 28.

Inside the clutch casing 18, the clutch shaft 31 is supported by the second and the third rolling bearings 28 and 30. The shaft 31 possesses splines 32 at its portion between the first shaft support 25 and the second shaft support 29. The splines 32 are in engagement with the crankshaft gear wheel 33 through a gear 34. A clutch wheel 35 is formed near the front (left in the drawing) end of the clutch shaft 31. The clutch wheel 35 comprises a disc-shaped flange 36 that extends radially by a preselected length and a cylindrical member 37 that stretches from the end of the flange 36 towards the gear 34. Splines 38 are formed at the outer periphery of the cylindrical member 37 such that a first clutch plate (to be described later) can shift in the axial direction. The clutch shaft 31 terminates in a radially reduced, downstepped shaft 43. A rolling bearing 44 is fitted around the shaft 43.

The first rolling bearing 20 rotatably supports a coupling shaft 39 which, in this embodiment, extends with the point of support in the rolling bearing 20 as its center, into the transmission casing 17 on the impeller 9 side, the outer periphery therein being formed into a gear 40, and into the clutch casing 18 on the gear 34 side, the outer periphery therein being formed into splines 41. On the other hand, the rear end of the coupling shaft 39 terminates in a bearing cavity 42 of a predetermined configuration to accept the stepped-down end 43 of the clutch shaft 31 together with its rolling bearing 44. That is to say, the rolling bearing 44 disjoins the clutch shaft 31 and the coupling shaft 39 in transmitting the driving force.

Inside the clutch casing 18, a disc-shaped first housing member 45 is formed near the flange member 19, and a disc-shaped second housing member 46 is provided near the first shaft support 25 side. These two housing members 45 and 46 have the same diameter and are joined with each other by a third housing member 47 of cylindrical shape having a diameter approximately equal to the diameter of the disc-shaped housing member, thereby defining an inner clutch housing. The members 45, 46 and 47 are tightly joined by bolts 48 in this embodiment. Therefore, as the clutch shaft 31 revolves, the second inner housing member 46 rotates in the same direction as the shaft 31, which in turn makes the third inner housing member 47 and the first inner housing member 45 rotate.

A cylindrical boss 49 extends rearward (right in the drawing) from the central part of the first inner housing member 45. Splines 50 are formed in the inner wall of the boss 49 so as to mesh with the spline 41. At the axial center of the second housing member 46, on the other hand, there is a shaft hole 51 so as to accept the clutch shaft 31 free of rotation. At the axial center of the second inner housing member 46, moreover, there is provided a boss 52, which extends towards the first housing member 45 and is so formed to loosely fit into the cylindrical member 37 of the clutch wheel 35. The boss 52 has a cavity 54 to accept a fourth rolling bearing 53 fitted on the clutch shaft 31. The fourth rolling bearing 53 disconnects the driving force from the second inner housing member 46 while rotatably supporting the member 46 on the clutch shaft 31.

A set of first plates 55 are engaged with the splines 36 formed on the outer periphery of the cylindrical member 37 so that plates 55 can move in the axial direction (right and left in the drawing), while a set of second clutch plates 56 are engaged with spline 57 formed on the third housing member 47 in its rear half such that it can also move in the axial direction. In the present embodiment, each individual plate of the second clutch plates 56 is sandwiched by two adjacent individual plates of the first clutch plates 55. The second housing member 46 is provided with a piston mechanism 58 for shifting the first and the second clutch plates 55 and 56 rearward and further for pressing them toward each other so that the revolution of the clutch shaft 31 is transmitted to the coupling shaft 39 through the second housing member 46.

The piston mechanism 58 is formed cylindrical in shape and is loosely fitted in the third inner housing member 47 with appropriate clearance and has a round opening 59 at its center to rotatably accept the front part of the clutch shaft 31 and the rear part of the coupling shaft 39. Moreover, the piston mechanism 58 includes a piston 60 facing the first inner housing member 45. A bellows 61 is attached to the member 45 at its one end and attached to the piston mechanism 58 at its other end so as to enclose the piston 60. The bellows 61 define a compartment 62 between the piston 60 and itself. The compartment 62 serves as a working oil reservoir which communicates with a working oil filter passage 63 bored in the first and second inner housing members 45 and 46. Therefore, the bellows 61 elongate as the working oil (a lubrication oil, for instance) is fed into the reservoir 62 through the filter passage 63, and the piston mechanism 58 is activated to engage the first clutch plate 55 with the second clutch plate 56, thereby allowing the rotary driving force to be transmitted from the clutch shaft 31 to the coupling shaft 39.

Turning now to the transmission mechanism, there is provided an intermediate gear shaft 64 extending parallel to the coupling shaft 39. A gear 65 is formed on the intermediate gear shaft 64 at its flange member 19 side to mesh with the gear 40 provided on the outer periphery of the coupling shaft 39. Another gear 66 is formed on the shaft 64 to mesh with a gear (which will be described later) on the impeller shaft 71. The intermediate gear 64 is supported by the flange member 19 and the impeller casing 1 through a roller bearing 67.

Here, it will be recalled that one major object of the present invention is to increase the impeller shaft marginal length so as to raise the resonant frequency of the impeller shaft, while locating the point of rotary support within the impeller casing. For this purpose, we provide at the point of rotary support in the impeller casing 1 a shaft support 91 that rotatably supports a second impeller shaft 73. The shaft support 91 is shaped conically with its front reduced in diameter and protrudes appropriately into a depression 69 (to be described soon hereafter). At the center of the depression 69, a bearing cavity 92 is bored in which a flange bushing 89 is integrally fitted, the flange bushing 89 in turn integrally holding a slide bearing 80 to support the secondary impeller shaft 73 revolution-free.

Turning now to the impeller 9, recessed on its back side 68 at its center is a depression 69 in the form of a truncated cone with its diameter progressively reduced toward the tip. In the present embodiment, the diameter and the depth of the depression 69, i.e., the two factors that determine the volume thereof, are specified in such a way that while the least necessary thickness to ensure the strength may be left with the impeller 9, the shaft support 91 of the impeller casing 1 may be fitted snugly thereon. At the axial center of the depression 69, bored clear through the impeller 9, is a bolt hole 70. The impeller shaft 71 is placed in the bolt hole 70, comprising a primary impeller shaft 72 that extends through and out of the bolt hole 70 and secondary impeller shaft 73 (introduced earlier) that is joined coaxially to the primary impeller shaft 72 at its rear end. Here, the diameter of the secondary shaft 73 is enlarged with respect to that of the primary shaft 72 so that the aforesaid joint will serve as a positioning step.

The part of the primary impeller shaft 72 that extends out of the impeller 9 through the bolt hole 70 is threaded into a screw 74, onto which a cap nut 75 is fitted so as to unite the primary impeller shaft 72 with the impeller 9. The secondary impeller shaft 73 is provided in the rear direction in turn with encircling grooves 76 and 77 of either V or U-shaped cross-section at an appropriate interval of which the front one, i.e., the groove 76, accepts a bearing 78 that is formed so as to follow the inner face of the recess 69. The bearing 78 is made of a material of suitable flexibility, having its clutch shaft 31 side edge folded back into a form of letter L, at whose bend 90 it is affixed to the impeller casing 1 with screws 79.

To another part, or the rear of the secondary impeller shaft 73, is formed a gear 81 that meshes with the power gear 66 and further ends with a shaft 82, which is stepped-down into a smaller diameter and is fitted into a fifth anti-friction bearing 83. To hold the fifth anti-friction bearing 83, provided within the transmission casing 18 is a stay member 84 extending in the radial direction of the casing 1 having at its end a third shaft support 85 for supporting the fifth anti-friction bearing 83 revolution-free.

Since the shaft support 91 of the impeller casing 1 has been placed within the recess 69 formed at the back side 68 of the impeller 9, the overhang of the impeller shaft 71, i.e., that distance thereof between the point of rotary support (or the point at which it comes into contact with the slide bearing 80) to the center of gravity of the impeller 9 (not shown) has been substantially shortened. By placing the center of rotary support of the impeller shaft 71 within the recess 69, moreover, the shaft marginal length, i.e., that distance of the impeller shaft 71 from the center of rotary support to the rear end thereof, has been substantially increased without altering the impeller total length, i.e., that total length including the impeller 9 and the impeller shaft 71. As a consequence, the resonant frequency of the impeller shaft 71 has been shifted up, thereby preventing resonant vibration of the impeller 9 and the impeller shaft 71 in the range of low engine revolution during ordinary service due to any remaining couple imbalance.

In the clutch casing 18, the flange member 19, the first shaft support 25, the first to the third inner housing members 45 to 47, the stay member 84, and the third shaft support 85 are each provided with a lubricant oil passage 86 so as to allow lubrication of the various bearings. In the present embodiment, the oil passage 86 shares a common lubricant oil main from which they are branched off. In the clutch shaft 31 and the coupling shaft 39, in particular, there are respectively provided along their central axis lubricant oil passages 87 and 88 so as to feed the lubrication respectively to the fourth anti-friction bearing 53 and the fifth anti-friction bearing 83.

For ordinary engine operation, we contract the bellows 61 by lowering the pressure of the lubrication oil contained in the reservoir 62 so as to relieve the piston mechanism 58 from exerting pressure on the first and the second clutch plates 55 and 56. Then the individual plates of the first and the second clutch plates 55 and 56 are kept separated. In this case, even though the rotary driving force is transmitted from the crankshaft gear wheel 33 to the clutch shaft 31 so that the clutch shaft 31 and the first clutch plate 55 are left slipping, the coupling shaft 39 and the intermediate gear shaft 64 do not rotate because no rotary driving force is transmitted to the third inner housing member 47 and the first inner housing member 45. As a consequence, neither the impeller shaft 71 nor the impeller 9 rotates during ordinary engine operation.

When it comes to applying the brake, however, we feed the working oil to the reservoir 62 through the passage 63 so as to raise the oil pressure in the reservoir 62. This expands the bellows 61 to make the piston mechanism 58 exert pressure on the first and the second clutch plates 55 and 56, thereby engaging them with each other. Then the rotary driving force is transmitted from the clutch shaft 31 to the third inner housing member 47 through the second clutch plates 56, thereby making the impeller shaft 71 and the impeller 9 rotate under the rotary driving force now transmitted through the first flange member 45, the coupling shaft 39, and the power gear 66. As a consequence, the impeller 9 performs compressor work by compressing the gas it draws in through the suction port 10 and expelling it through the compressed air delivery port 11. This amounts to the impeller 9 making the engine (not shown) perform resistance work through the crankshaft gear wheel 33 and applying braking action on the engine.

It is to be noted here that the brake mechanism for vehicles of this invention in the illustrated embodiment is mainly for motor vehicles, particularly in the case of, for example, negotiating a long downhill, where it may be used as an auxiliary to the main brake (e.g., a foot brake). When the ordinary engine brake is in action during downhill driving, the engine is under an effectively augmented braking force with the aid of another brake applied on the engine according to this invention.

In summary, since the internal combustion engine consumes further energy, i.e., it gives additional kinetic energy to the working medium, air or exhaust in this embodiment, highly effective deceleration of the vehicle can be achieved, the more so the faster the vehicle is going or the faster the impeller 9 is rotating.

Finally, we contemplate in a second embodiment to apply the principles of the present invention to the turbocharger. Here, we provide recesses, each similar to the illustrated recess 69 on the back sides of both the turbine and the blower, thereby achieving a substantial shortening of the respective length between the rotation support center and the center of gravity of each impeller.

I claim:

1. A brake mechanism used in a vehicle, comprising:
   a gear connected to an output shaft of an engine of the vehicle:
   a casing;
   a radial compressor disposed in the casing and having an impeller rotatable about an axis and having a front end, an impeller shaft having a rear end distal from the front end of the impeller and extending from the back of the impeller in the casing, a suction port, and an outlet port for sucking in air from the suction port, compressing it within the casing, and delivering it from the outlet port by the impeller, the impeller being axially fixed;
   a gear for connecting the impeller shaft with the engine output shaft gear;
   a shaft support for rotatably supporting one end of the impeller shafts;
   a recess formed in the back of the impeller for accepting the shaft support; and
   a bearing provided in the casing for supporting a second end of the impeller shafts;
   said gear being drivingly connected with the impeller shaft at a position between the shaft support and the bearing;
   whereby the distance between the shaft support and the bearing is substantially extended without extending the length between the front end of the impeller and the rear end of the impeller shaft, such that the resonant frequency of the impeller shaft is increased and resonant vibrations of the impeller are prevented.

2. A brake mechanism for vehicles according to claim 1, wherein the recess has a configuration analogous to the shaft support.

3. A brake mechanism for vehicles according to claim 1, wherein the shaft support in the impeller casing is provided with a bearing for supporting the impeller shaft.

4. A brake mechanism for vehicles according to claim 3, wherein the bearing is a slide bearing.

5. A brake mechanism for vehicles according to claim 1, including a bearing for supporting the impeller shaft, and wherein the shaft support is in the shape of a cone whose tip is truncated and is constructed so as to integrally contain the bearing.

6. A brake mechanism for vehicles according to claim 1, wherein a groove is formed on the impeller shaft in the circumferential direction of the impeller shaft in the vicinity of the impeller, and there is further provided a cylindrically shaped bearing fitted in the groove, the bearing extending along the recess to cover the shaft support and serving as a seal ring.

7. A brake mechanism for vehicles according to claim 1, wherein the impeller shaft is connected to a transmission mechanism that transmits driving force from the engine output shaft gear, the transmission mechanism being connected with the engine output shaft gear via a clutch mechanism, and the transmission mechanism is housed in a transmission casing, the clutch mechanism being housed in a clutch casing, the casings being connected to each other in the axial direction of the impeller shaft.

8. A brake mechanism for vehicles according to claim 7, wherein the transmission mechanism includes a gear train.

9. A brake mechanism for vehicles according to claim 7, wherein the clutch mechanism includes a hydraulic clutch.

10. A brake mechanism for vehicles according to claim 7, wherein said clutch mechanism being movable between driving and non-driving positions, and said impeller not rotating when said clutch mechanism is in said non-driving position.

11. A brake mechanism for vehicles according to claim 1, wherein said radial compressor is a single stage compressor.

12. A brake mechanism for vehicles according to claim 1, including a slide bearing on the shaft support, and wherein:
   the impeller shaft includes first, second and third sections respectively of differing diameters,
   the slide bearing receives the impeller shaft at the first section thereof,
   the gear is connected to the impeller shaft at the second section thereof, and
   the third section of the impeller shaft includes the second end thereof.

* * * * *